April 28, 1936.  W. DUBILIER  2,038,553
HIGH TENSION GENERATOR
Filed Jan. 22, 1934
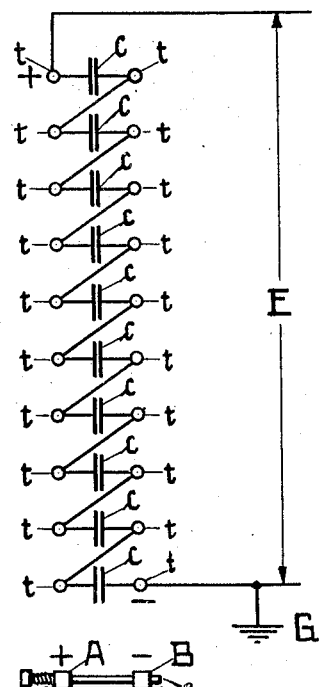
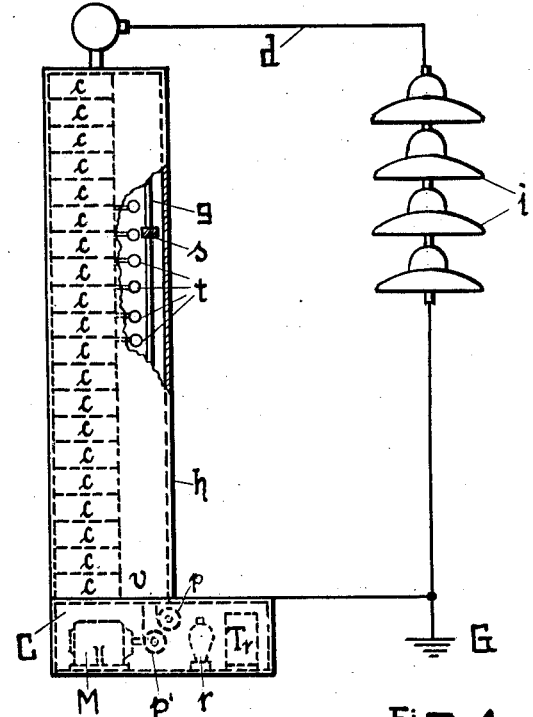
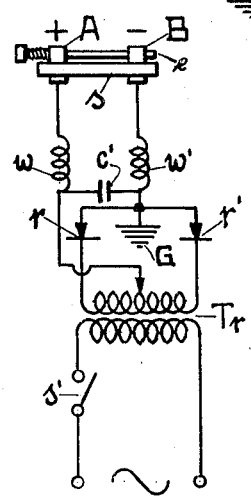
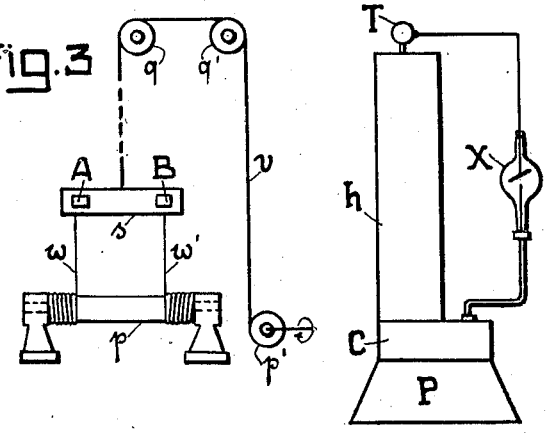
INVENTOR
WILLIAM DUBILIER
BY
ATTORNEY Patented Apr. 28, 1936

2,038,553

UNITED STATES PATENT OFFICE 2,038,553

HIGH TENSION GENERATOR

William Dubilier, New Rochelle, N. Y.

Application January 22, 1934, Serial No. 707,712

29 Claims. (Cl. 171—97)

My invention relates to a new and novel arrangement for the production of high potential and more particularly to an apparatus for generating high potential currents to any desired voltage.

While the invention is particularly applicable to generators or systems for supplying high voltage direct current in the form of short impulses, the invention may similarly be used and with advantage for producing a series of continuous current impulses rapidly following each other, which time period can easily be controlled.

Particularly important is this invention in that it utilizes apparatus constructed and insulated for a comparatively small fraction of the voltage that is desired to be generated and with a comparatively small fraction of the power used at present for generating similar potentials.

In systems of this nature for producing extremely high potentials as known in the prior art as, for instance, in connection with the operation of testing apparatus for insulators, X-ray equipment, signaling apparatus, or other devices where high potentials are required, usually an alternating current transformer is provided with high potential insulators or bushings and with the secondary of the transformer carefully designed, constructed and insulated for such high potentials to overcome serious well-known insulation difficulties. This made the transformer extremely bulky and expensive. If a condenser was to be used in connection with the high voltage and connected across the secondary, then an extremely high power transformer would be necessary, although such high power would only be required for short periods or impulses. If such a transformer is required for 200,000 or 300,000 volts or up to one million volts or more, the insulators become a very serious problem in that they not only project many feet above the metal container of the transformer and considerably into the container, and such insulators are very costly and a transformer for generating 500,000 volts would cost many thousands of dollars, even though a small amount of current or power is required. In my invention, this problem is eliminated.

If a direct current impulse is required and the high voltage must be rectified, the rectifiers become very bulky and expensive in initial cost and in operation. This drawback is eliminated with my novel device.

A complete equipment to generate a high voltage impulse as known heretofore, for example, to charge a condenser, would consist of a large high tension transformer, a large high tension rectifier, and a large high tension condenser; all of which are extremely costly, bulky, and difficult to operate, as is well known in the art. When the apparatus is used for X-ray purposes or for testing high tension insulators or the like, as a surge voltage or lightning generator, or for other similar purposes, the power is only required for a very short period of time. The apparatus, however, is so made and designed as to be able to carry this power for long periods. In addition to the extremely high initial manufacturing costs, other complications are involved, such as the expense of shipping and packing large bulky apparatus and the housing of same where the apparatus is to be used, as well as providing for the suitable operation so that for a high potential X-ray equipment, special wiring is required for the large transformer, etc. All of these features add to make the equipment extremely expensive.

Accordingly, it is one object of my invention to provide a new and novel arrangement for easily and economically producing the desired high potentials, especially if a direct current impulse is required for short periods of time by the utilization of comparatively simple low voltage apparatus available on the market at low costs and at present in use for other purposes. This arrangement is described in detail hereinafter.

A further object of the invention is to materially decrease the size of the initial power source and the apparatus, such as the transformer, the rectifier, and to make possible the use of standard condenser units built up to the desired high potential.

Another object of my invention is to completely eliminate a high tension insulator by utilizing a bank of condensers for building up a desired high potential, each condenser being designed for a comparatively small fraction only of the output voltage, whereby the condenser acts as its own insulator, thus completely eliminating any high tension insulating problems.

Another object of my invention is to use a small power supply at the low tension input side for producing a large power available at the high tension side, thus making possible the use of standard low tension apparatus and insulators without involving any new design problems liable to increase manufacturing and operating costs.

Still a further object of my invention is to provide a high tension generating apparatus which is simple in design and economical in operation and which may be constructed by using standard parts, such as transformers, rectifiers, condensers, insulators, available at low cost on the market for other purposes.

Still a further object of the invention consists in the provision of a high tension generator in which the output voltage can be easily varied at will without switching operations or any other changes to be made at the electrical parts, especially the high tension parts of the system.

These and further objects and aspects of my invention will become more apparent from the following description taken with reference to the accompanying drawing in which I have shown one form of embodiment of the invention and which, as will become obvious, is subject to various modifications and variations all coming within the broader scope and spirit of the invention, as set forth in the appended claims.

Figure 1 illustrates diagrammatically the arrangement and operation of a high tension generating system according to my invention.

Figure 2 shows schematically an apparatus designed to carry out the invention.

Figure 3 shows in more detail the operating mechanism as used in connection with Figure 2.

Figure 4 illustrates diagrammatically an apparatus as described operating an X-ray tube.

Similar reference characters identify similar parts throughout the different views of the drawing.

Referring more particularly to Figure 1, a small transformer $Tr$, say for example for 5,000 to 10,000 volts, is connected in a well-known manner to rectifiers $r$ and $r'$ which are available for this voltage and not larger than ordinary radio tubes to produce a direct current across the terminals A and B. Let us assume, that this voltage is 5000 volts. A number of condensers $c$ or condenser units are stacked up in a bank, as shown, each unit being made to operate at 5000 volts direct current.

The condensers may be placed, as illustrated, suitably insulated and connected in a series arrangement as shown in the diagram. If 500,000 volts of high tension E are required, 100 condensers or units are connected in series, as shown. If a higher voltage is required, additional condensers can be stacked on the bank or each unit can be designed for a higher voltage such as for 10,000 volts operation and the units made in a well known suitable way, so that the complete condenser bank need not be any higher than the ordinary insulator designed for that voltage which is practically one-half of the height of the high potential transformer designed for that voltage. Since a small transformer and small rectifying tubes are used, these can all be housed in a small box upon which the condenser bank is mounted, as shown at C, Figure 2. Naturally, any other value for the input voltage may be chosen, as desired and dependent on the high tension voltage to be generated.

In this manner, a large number of low voltage condensers of standard make can be used which are available at low cost and which can be easily made up for voltages from 5000 to 10,000 volts each. Alternatively, each condenser $c$ may represent a condenser group or section comprising a number of individual small condensers connected in series. In this manner, if necessary, inexpensive electrolytic condensers of very small size can be used for combining for instance, ten condensers of 500 volts each to make up a section of 5000 volts about one inch high in a flat layer with suitable insulation. If 200 of these sections are placed in series for obtaining a high tension of one million volts in a convenient manner, they would make a stack approximately seventeen feet high, which is much smaller than the height of a high tension transformer for the voltage which would be required in an arrangement as known heretofore.

When the current is connected, a comparatively low rectified voltage, such as 5000 volts in the example given, is applied across the terminals A and B. These terminals are connected by flexible leads $w$ and $w'$ to the rectifier and are so arranged on the fixture and support $s$ as to rapidly move up and down in front of the condenser. Any suitable mechanical arrangement may be provided for this purpose, moving the contacts A and B up alongside of the bank and making contact with the condenser terminals $t$ projecting from the condenser bank. As each condenser unit has its terminals projecting from the bank, actual mechanical contact between the contacts A, B and the condenser terminals $t$ is not necessary as the 5000 volts will jump across a small gap, thus charging the condensers through a small arc.

When the contacts A and B move up from the base, a short-circuiting rod, shown at $e$, may be arranged according to a further feature of the invention for short-circuiting the terminals in such a manner that the short-circuiting rod may be pushed in when the terminals move upward and released when they move in a downward direction. In this manner, any residual charges left in the condenser or condenser sections from a previous operation will be dissipated during the upward movement through the short-circuiting rod which may include a resistor for this purpose. The switches, connecting and disconnecting the power supply, may be opened either by hand or automatically by the operating mechanism when the contacts move in the upward direction and during dissipation of the residual condenser charges by the short-circuit rod 3 to prevent reaction of the short-circuit current impulses upon the network to which the primary circuit of the transformer is connected.

After the contacts have moved up to the top of the stack, they begin to move down and charge the condensers successively until they reach the bottom. Thus, for instance, in the case of a condenser bank in which each unit is charged to 5000 volts according to the above example, a high tension E of 500,000 volts would be obtained between the ends of the bank by using a bank of 100 units. The thus obtained high tension may be used for any desired purpose, such as operating an X-ray tube or for testing insulators and other electrical devices, if a single discharge or high tension impulse is required. In this case the contacts are moved up and down once for each discharge required and, where a very short period is necessary, such as for X-ray operation, the time and current can be controlled by the capacity of the condenser.

Referring to Figure 2, this shows a suspension insulator $i$ connected to the high tension terminal T through a connecting lead $d$ and ground for testing purposes. The negative terminal of the condenser bank may preferably be grounded, as shown at G, and the negative terminal of the rectifier may also be continuously grounded as shown, since the condensers are charged starting from the high tension end to the low tension and in such a manner that the contacts A and B are always connected to the lowest or ground potential on the condenser bank, thus completely eliminating any insulation problems of the transformer and rectifier apparatus.

Thus, in an apparatus as described, the only actual high tension part of the apparatus is the condenser, and since the condenser is sub-divided into many units, the insulation problem is simplified as the potentials are divided evenly into small units and therefore any two adjoining electrodes carry merely a fraction of the total voltage. If desired, a condenser $c'$ may be connected in parallel to the contacts A and B or output of the rectifier for smoothing the rectified output voltage to insure equal charging of the condensers to substantially the same potential.

Another advantage of the invention, especially as applied to X-ray and other work, is that the power required can be taken from the ordinary power supply now available from the electric light lines instead of special heavy cables necessary in the prior art equipment. Any type of rectifier tubes available on the market may be used and the tubes can utilize a separate transformer for the filaments, which is available on the market for that purpose, so that the invention can be substantially carried out without the construction of any new apparatus requiring new designs and involving the solution of new problems.

The mechanical mechanism for moving the contacts A and B up and down may be of any suitable construction and may, for instance, consist of a driving motor operating a wire or pulley arrangement carrying the contact support $s$ moving in suitable guides, as shown at $g$ in Figure 2, mounted on a casing or container $h$ for housing the entire apparatus. Alternatively the contacts may be arranged on a collapsible mechanism carrying contacts A and B and which may extend and collapse alongside the condenser contacts $t$ or any other suitable mechanical arrangement may be provided, as is obvious. The operating mechanism and the motor and any further auxiliary apparatus necessary may be arranged in a base C serving as a support for the high tension parts which are thus sufficiently removed against danger on the part of the operator.

One way of making this apparatus consists in providing conducting wires coming from the rectifier and transformer as indicated in Figure 2, carrying the charging current and winding up and unwinding on insulated rods or pulleys as shown at $p$ with a spring attachment similar as known in window shade operating mechanism.

According to another construction, a small winding apparatus may be provided which by means of a pulley and an insulated cord serves for pulling the contacts up with flexible leads connected to the contacts which wind and unwind on an insulated rod with a spring rewinding attachment, such as is used in window shade operating mechanism such as shown in more detail by Figure 3.

In this latter figure, I have shown an insulating rod or cylinder $p$, preferably provided with spring winding attachment (not shown) and upon which wind and unwind the charge carrying wires $w$ and $w'$ connected to the contacts A and B, respectively, carried by the member $s$. The member $s$ is pulled in an upward direction against the action of the spring mechanism connected to the rod $p$ by means of a wire $v$ over guide rollers $q$ and $q'$ and by means of a winding pulley $p'$. The operation may be either by hand or by motor as is understood. After the contacts have arrived at the top position, the motor may be disconnected whereby through the action of the spring mechanism the wire $v$ will unwind and the member $s$ be moved in the downward direction, thus rewinding the lead wires $w$ and $w'$ and charging the condenser $c$, as described hereinbefore.

Friction means can be applied for regulating the speed of movement both up and down and the winding up and down can be arranged with a motor as shown at M in Figure 2, and so arranged that the contacts or the drive is broken after the contacts are moved up and returned downward, as pointed out hereinbefore.

The apparatus as described is furthermore easily adapted for utilizing any desired fraction of the high tension voltage E by stopping the motor or other driving mechanism at any desired position of the contacts A and B during the downward or charging movement. No switching operations or any other changes at the electrical parts, especially the high tension parts are necessary since the negative contact B is always connected to ground, as shown, thus completing the circuit for an output high tension device connected between the ends of the condenser bank, as shown.

In place of the high tension suspension type insulator as shown by Figure 2 for testing and other purposes, it is understood that any other high tension insulation device, such as high tension bushings, a high tension cable, etc., may be provided for testing and experimenting purposes to determine its behavior under high tension electric stress.

According to one embodiment, the movement of the contacts in the downward direction may be stopped when the insulator breaks down, whereby their position will indicate the breakdown voltage of the particular insulator used.

The invention, as pointed out, is furthermore applicable to uses requiring an impulse voltage, such as for producing an artificial breakdown to set up an artificial voltage surge in a connected network for testing electric apparatus, such as transformer windings, motors, etc., thus obtaining an artificial lightning generator for testing or experimental purposes. Alternatively, the invention may be used for supplying high tension load devices operated by a short high tension impulse or flash, such as an X-ray tube and the like. An arrangement of this sort is shown schematically by Figure 4 in which X represents an X-ray tube connected to the high tension terminals of the apparatus and in which I have furthermore shown a base or pedestal P serving as an insulator for sufficiently removing the high tension terminal from ground to prevent accidents on the part of the persons attending the apparatus.

I claim:

1. A high tension generator comprising a bank of electrical condensers connected in series, means having a common terminal with said generator for producing a current of comparatively low potential compared to the high potential to be generated, and means for charging said condensers by said first means in succession until the desired high tension is reached.

2. A high tension generator comprising a bank of condensers connected in series, a low potential generator, and means having a common low potential terminal with said high tension generator for charging said condensers in succession by said low potential generator starting from the high potential end to the low potential end of said bank.

3. A direct current high tension generator comprising a bank of electrical condensers connected in series, a low potential direct current generator, and means for charging said condensers in succession by said low potential generator starting from the positive end to the negative end of said bank, the negative pole of said low potential generator being constantly connected to the negative end of said bank.

4. A high tension generator comprising a bank of electrical condensers connected in series, projecting terminal means for said condensers, a low potential generator, movable contact means connected to the output of said low potential generator, and means for moving said contacts along the projecting terminals of said condensers for successively charging said condensers until a desired potential is reached between the ends of said bank, the negative terminal of said low potential generator being constantly connected to said negative end of said bank.

5. A high tension impulse generator comprising a bank of electrical condensers connected in series and mounted in a bank, projecting terminal means for said condensers, a generator producing a direct potential being a small fraction of the desired high tension, a pair of movable contact means connected to the output of said last mentioned generator adapted to move alongside said projecting terminals for successively charging each of said condensers at low potential to build up a high potential difference between the ends of said bank, one terminal of said direct potential generator being constantly connected to one end of said condenser bank.

6. In a high tension generator as claimed in claim 5 in which the high tension of the condenser is built up from the high tension positive end to the negative end of the condenser series.

7. In a high tension generator as claimed in claim 5 in which said low potential generator consists of a transformer to be supplied from an alternating current network and a rectifier connected to the output of the transformer.

8. In a high tension generator as claimed in claim 5 in which said movable contacts are at a distance from said condenser terminals to produce a small arc therebetween for charging the condensers.

9. In a high tension generator as claimed in claim 5 in which said movable contacts are arranged on a support moved alongside the projecting condenser terminals in both directions by a pair of insulated conducting wires serving to carry the charge current and cooperating with a pulley driving mechanism.

10. In a high tension generator as claimed in claim 5 in which the charge current is supplied to said movable contacts through flexible leads to the output of said low voltage generator.

11. In a high tension generator as claimed in claim 5 in which the negative terminal of said direct potential generator is connected to the negative end of said condenser bank or ground, respectively.

12. An apparatus for generating high potentials comprising a stack of comparatively high capacity condensers so arranged that the condensers are charged to the same polarity successively in electrical alignment, and means for successively charging said condensers at comparatively low potential beginning at the high potential end of the stack, the negative terminal of said charging means being constantly connected to the negative end of said stack.

13. In a high potential apparatus consisting of a bank of comparatively large capacitor units connected in series, one end of which is grounded, and means for charging at comparatively low voltage the high potential unit of the bank by starting from the high potential end and gradually continuing to charge the successive units until the low potential end is reached, the negative terminal of said charging means being constantly connected to ground.

14. High tension apparatus comprising a bank of comparatively low potential condenser units connected in series with terminals arranged on said units, a source for producing a comparatively low potential, said units being arranged so that all the terminals in alignment are successively charged from said source and with the same polarity starting from the high potential end of said bank, the low potential terminal of said source being constantly connected to the low potential end of said bank.

15. In an apparatus for producing electric high tension comprising a bank of condenser units connected in series, one end of which is grounded and the other connected to the high potential terminal, a source for producing a comparatively low potential uni-directional current the negative pole of said source being constantly grounded and terminals from said uni-directional current source arranged to be moved progressively for charging said condensers beginning with the high potential terminal towards the low potential or grounded terminal of said bank.

16. In a high potential apparatus comprising a bank of a large number of comparatively low potential condensers connected in series, a source of alternating current supply, an alternating current transformer supplied from said source, means for rectifying the output of said transformer, means for smoothing said output, and connections from said rectified current arranged to charge the high potential unit of the condenser bank and successively the other units until the desired high potential is built up, the negative terminal of said source being constantly connected to the negative end of said bank.

17. A method of operating a high potential consumption device consisting in connecting to said device a progressively increasing number of energy storage devices in series while simultaneously charging said devices to a low potential until the desired high operating potential has been built up.

18. A method of operating a high potential consumption device consisting of producing and applying an electric charge at low potential to said device, and building up said low potential to a high potential by progressively adding in series thereto an increasing number of further low voltage charges until reaching a desired high potential for operating said device.

19. A method of operating a high potential consumption device from a low voltage consisting in producing and applying a low voltage charge to said device, and building up said low voltage to a high voltage by progressively adding thereto in series a gradually increasing number of further low voltage charges starting from the high potential end to the low potential end of the series.

20. A method of operating a high potential consumption device from a low voltage comprising producing a low voltage condenser charge and applying said low voltage to said device, and gradually building up said low voltage to a high voltage by progressively adding an increasing number of further condensers in series to said first condenser while simultaneously charging the newly added condensers at low potential until a desired high potential has been built up for operating said device.

21. A method of operating a high potential consumption device comprising producing and applying a low voltage condenser charge to said device, and gradually building up said low voltage to a high voltage by progressively adding thereto an increasing number of further condensers in series while simultaneously charging the newly added condensers at low potential starting from the high potential end to the low potential end of the series.

22. The method of producing high electric direct potential from low direct potential comprising producing a low voltage output potential by setting up a low voltage condenser charge and building up said low voltage charge by progressively adding thereto in series an increasing number of low voltage charges until obtaining a desired high output potential.

23. The combination with a low voltage source of direct current and a high voltage uni-directional consumption device, a plurality of energy storage devices connected in series relation across said consumption device, a connection between the negative terminal of said consumption device and the negative terminal of said source, and means for successively charging said storage devices by said source for building up a desired high potential.

24. The combination with a low voltage source of direct current and a high voltage uni-directional consumption device, a plurality of electric capacitors connected in a bank in series relation across said device, a connection between the negative terminal of said device and said source, and means for successively charging said capacitors starting from the high potential end to the low potential end of said bank.

25. The combination with a low voltage source of direct current and a high voltage uni-directional consumption device, a plurality of energy capacitors connected in a bank in series relation across said device, means for successively charging said capacitors by said source, and means for constantly short-circuiting the non-charged condensers of said bank during the charging period.

26. The combination with a low voltage source of direct current and a high voltage uni-directional consumption device, a plurality of energy capacitors connected in a bank in series relation across said device, means for successively charging said capacitors by said source starting from the high potential to the low potential end of said bank, and means for constantly short-circuiting the non-charged condensers of said bank during the charging period.

27. A high tension generator comprising a bank of electrical condensers connected in series, projecting terminal means for said condensers, a low potential generator, movable contact means connected to the output of said low potential generator, further means for moving said contacts along the projecting terminals of said condensers for successively charging said condensers until reaching a desired high potential difference between the ends of said bank, a high tension device connected between the ends of said condenser bank, said contacts being arranged to move in one direction for successively charging said condensers, and short circuit means for said contacts becoming operative when moving in the opposite direction for dissipating residual charges of said condensers left after the discharge through said high tension device.

28. A high tension generator comprising a bank of electrical condensers connected in series, projecting terminal means for said condensers, a generator for producing a direct potential which is a small fraction of the desired high potential, a pair of movable contact means connected to said generator and adapted to move alongside said projecting terminals for successively charging each of said condensers at low potential for building up a high potential difference between the ends of said bank, a high tension device connected between the ends of said condenser bank, and short circuit means for said contacts becoming operative during the return movement of said contact means.

29. A high tension generator comprising a bank of electrical condensers connected in series, a low potential generator, means for successively charging said condensers by said generator until reaching a desired high potential difference, a high tension device connected between the ends of said condenser bank, and short circuit means for dissipating residual charges of said condensers left after a high potential discharge through said high tension device.

WILLIAM DUBILIER.